(12) United States Patent
Kearney et al.

(10) Patent No.: US 7,336,701 B2
(45) Date of Patent: Feb. 26, 2008

(54) METHOD FOR IMPLEMENTING A COMMUNICATION TRANSCEIVER IMPAIRMENT EMULATOR

(75) Inventors: Kenneth P. Kearney, Smithtown, NY (US); Leonid Kazakevich, Plainview, NY (US); Timothy A. Axness, Collegeville, PA (US); James Nolan, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 877 days.

(21) Appl. No.: 10/322,166

(22) Filed: Dec. 18, 2002

(65) Prior Publication Data

US 2003/0202571 A1    Oct. 30, 2003

Related U.S. Application Data

(60) Provisional application No. 60/344,311, filed on Dec. 20, 2001.

(51) Int. Cl.
   *H04B 17/00* (2006.01)
(52) U.S. Cl. .................................... 375/224; 375/222

(58) Field of Classification Search ................ 375/224, 375/285, 226, 222; 324/620; 702/58
See application file for complete search history.

(56) References Cited

U.S. PATENT DOCUMENTS

| 5,233,628 A | 8/1993 | Rappaport et al. |
| 5,937,004 A | 8/1999 | Fasulo, II et al. |
| 6,151,559 A | 11/2000 | Williams |
| 6,977,977 B1 * | 12/2005 | Dubrovin et al. ........... 375/346 |

FOREIGN PATENT DOCUMENTS

WO    01/06684    1/2001

* cited by examiner

*Primary Examiner*—Khai Tran
(74) *Attorney, Agent, or Firm*—Volpe and Koenig, P.C.

(57) ABSTRACT

A method for emulating signal impairments to enable dynamic evaluation of transmit and receive modem performance through the use of computer-generated models enabling both an evaluation of system performance as well as a comparison of results obtained from system designs respectively exposed to both impaired and unimpaired conditions to enable direct comparison as well as comparison with standardized measurement values to facilitate system design activities prior to any hardware implementation.

35 Claims, 2 Drawing Sheets

METHOD FOR IMPLEMENTING A COMMUNICATION TRANSCEIVER IMPAIRMENT EMULATOR

CROSS REFERENCE TO RELATED APPLICATION(S)

This application claims priority from provisional application No. 60/344,311 filed Dec. 20, 2001 which is incorporated by reference as if fully set forth.

BACKGROUND

The present invention relates to communications, communication networks and especially wireless type networks. More particularly the present invention relates to a method for evaluating network design and characteristics through the introduction of impairments to the network and enable more efficient and cost effective testing and evaluation.

DESCRIPTION OF THE RELATED ART

A communication system typically transmits an information signal from a source to a destination over a medium, which may be guided or unguided such as copper, optical fiber or air, the medium being commonly referred to as the communication channel. The information signal is altered, i.e., modulated, to match the characteristics of the channel. The communication is demodulated at the receiving end to recover the information-bearing signal. The communication system typically compromises a transmit modem, an up converter or transmitter, communication medium, down converter or receiver and a received modem. The input data is modulated and up converted on to a predefined carrier frequency and outputted to the communication medium. Inverse operations are performed at the receiver.

Modulation techniques presently in use include frequency modulation (FM), frequency shift keying (FSK), phase shift keying (PSK), binary phase shift keying (BPSK) and differential phase shift keying (DPSK). The most commonly used high speed methods for data modulation are quadrature amplitude modulation (QAM) and quadrature phase shift keying (QPSK). These techniques modify the amplitude and phase of a predefined carrier frequency according to an input signal in order to transmit multiple bits per baud to make more efficient use of available bandwidth.

Modulation, such as quadrature modulation is typically performed in a modem, providing a baseband output whereupon a predefined carrier frequency is modulated with the baseband output and is amplified and transmitted in the communication medium. Up conversion is utilized when channel frequencies are above the base band frequencies. Phase modulation techniques must be capable of overcoming phase synchronization problems. For example, the I and Q channels employed in quadrature modulation must have the same gain, since mismatched signal gains or magnitudes create processing errors. Phase differences between the carrier waveform signals cause spillover between individual channels resulting in degraded performance. These impairments are a common occurrence and are due in part to the electronic mixers, filters, a/d converters and so forth employed in up and down converters. Each of the components contribute their own variations in specified value due, for example, to temperature, manufacturing tolerances and other factors affecting signal integrity.

Impairments with linear behavior are encountered and are characterized by changes in output gain or phase which are independent of the magnitude of the input signal:

a) Amplitude imbalance
b) Phase imbalance
c) Phase jitter
d) Carrier frequency offset (receiver only)
e) Carrier leakage (transmitter only)
f) Gain ripple
g) Phase ripple Non-linear impairments are also encountered and are characterized by changes in output gain or phase, which vary in dependence upon magnitude of the input signal. Two major signal impairments include:

a) amplitude-to-amplitude (AM-AM) distortion caused by nonlinearities in the overall amplifier gain transfer function and b) amplitude-to-phase distortion (AM-PM conversion) distortion caused by amplitude dependent phase shifts (transmitter only).

In addition to the impairments encountered during up and down conversion, the communication media, whether guided or unguided is also influenced by obstacles, attenuation and wave reflections which perturbations affect signal level by many dB and are continually changing in a mobile communication environment. The propagation characteristics vary widely depending upon whether a communication link is fixed or mobile, the condition of the propagation path and the composition of the medium itself.

When designing and prototyping new communication systems baseband modulations/demodulation components are routinely and thoroughly tested as well as up/down conversions to and from the transmission channel operating frequencies. Prior art testing techniques typically comprise signal generators, $E_b/N_0$ (i.e., ratio of carrier of bit energy to noise energy) generators and meters, channel emulators and so forth. However this method does not include conversion components.

In addition thereto it is highly desirable to be capable of differentiating between up/down conversion and transmission channel impairments from algorithmic or other systemic deficiencies and further to be capable of evaluating designs and modifying such designs, if and when necessary, prior to actual hardware implementation including prototype implementation thereby providing a method which provides significant time and cost efficiencies.

SUMMARY OF THE INVENTION

The present invention provides a method for emulating signal impairments to enable dynamic evaluation of transmit and receive modem performance through the use of computer-generated models enabling both an evaluation of system performance as well as a comparison of results obtained from system designs respectively exposed to both impaired and unimpaired conditions to enable direct comparison prior to any hardware implementation.

BRIEF DESCRIPTION OF THE DRAWINGS

The objects and advantages of the present invention will become understood from the following detailed description and drawings wherein like elements are designated by like numerals and, wherein.

DETAILED DESCRIPTION OF THE PRESENT INVENTION

The models developed were coded them in C and imported into test benches built in Cadence's Signal Processing WorkSystem simulation environment. The models developed allow introduction of number of different radio impairments into a simulation environment that models the baseband physical layer. While the designers used the Cadence tool and coded the model in C code for this implementation, the same methodology would be applicable to different modeling environments and coding languages. Also the designers studied the effect on the 3G TDD signal but again the methodology and models could be used in other modulation schemes.

Figure 1:
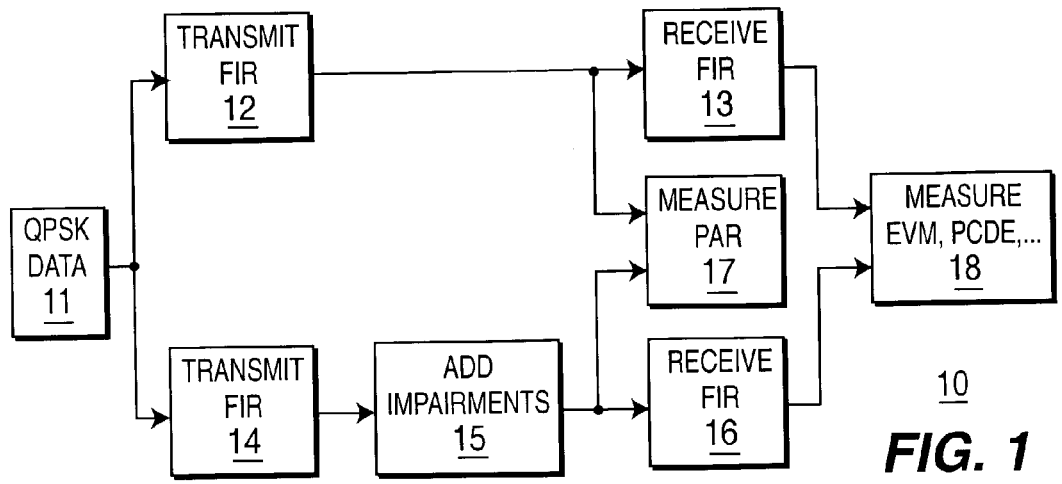
FIG. 1 is a diagram showing a simplified transmitter useful in explaining the methodology of the present invention.
Figure 2:
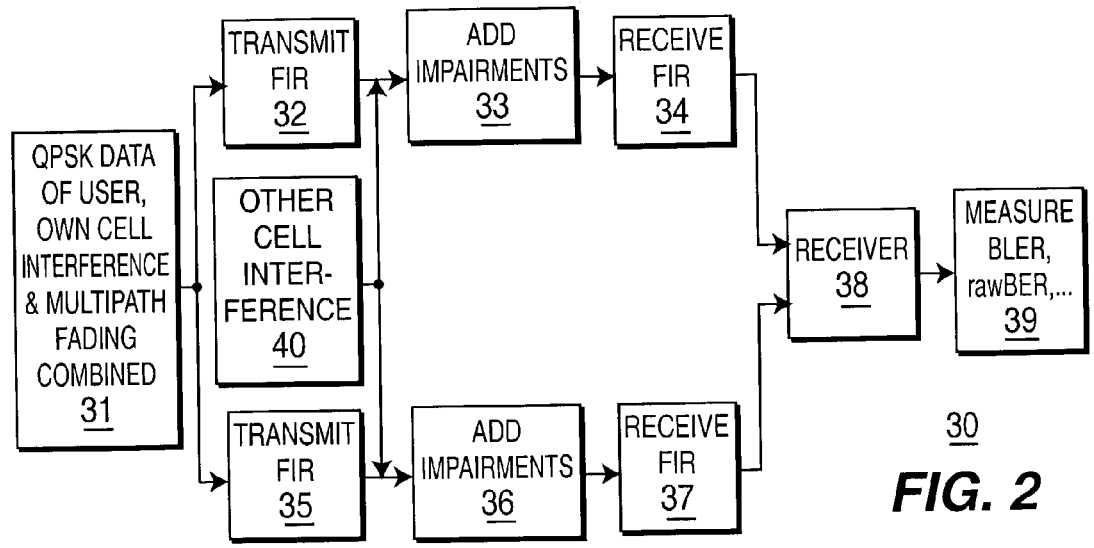
FIG. 2 shows a simplified uplink receiver useful in explaining the methodology of the present invention.

As implemented, the radio impairment block (15 shown in FIGS. 1, 33 and 36 shown in FIGS. 2 and 64 shown in FIG. 3) includes a parameter screen, such as a touch screen, not shown for purposes of simplicity, which allows the operator to select those impairments to include and to set the values for each impairment to be included.

FIG. 1 shows a test model in which quadrature phase shift keyed (QPSK) data is generated at 11 and undergoes finite impulse response filtering at 12 and 14. An impairment is introduced at 15. The impairments which are introduced are set forth in detail below. The peak to average ratios (PARs) are measured and compared at 17.

Receive FIR filtering on the transmitted signals is performed at 13 and 16 and the filtered signals are measured and compared for error vector magnitude (EVM), peak code domain error (PCDE), etc. at 18. This test module evaluates a non-ideal transmitter in the absence and presence of various impairments. The FIR filtering may be modified to less than ideal parameters to determine their effects on the transmitted signal with and/or without impairments.

FIG. 2 shows an uplink receiver test module 30 in which user QPSK data is combined at 31 with its own cell interference and multipath fading; and filtered by transmit FIRs at 32 and 35. Other cell interference such as TDD interference from one or more neighboring cells with different scrambling codes is introduced at 40 and impairments are introduced at 33 and 36. Although the same impairments are provided, the settings of the impairments provided at 33 and 36 could be different for this test module with receiver diversity. The resultant signals are filtered by receiver FIR filters 34 and 37 and then undergo functions performed by a receiver, such as demodulation, amplification, etc.

The signals are then measured at 39, testing for block error rate (BLER) raw bit error rate (BER), etc. Non-ideal shaping filters of both transmit and receive type may also be modeled to determine how they affect design.

Figure 3:
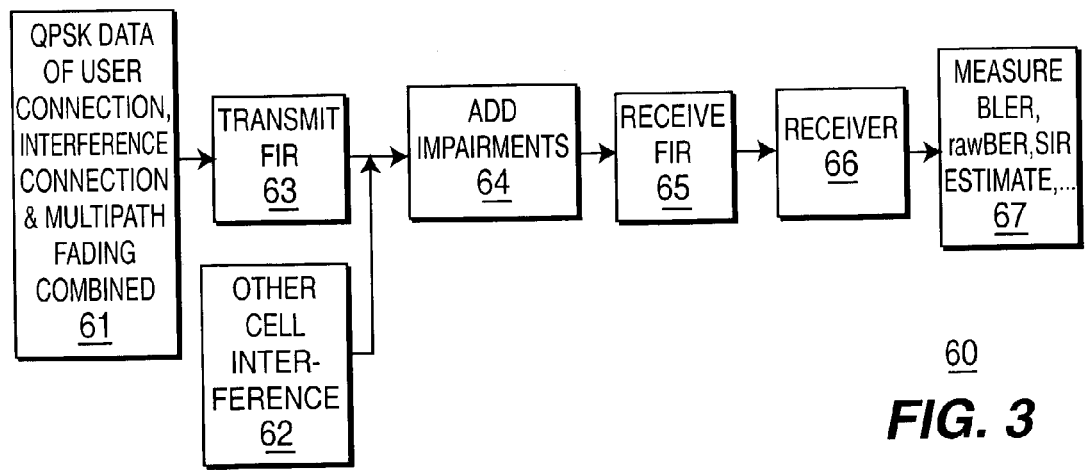
FIG. 3 shows a simplified downlink receiver useful in explaining the methodology of the present invention.

The module 60 in FIG. 3 examines the result of downlink receiver impairment wherein the user QPSK data connection, interference connection and multipath fading are combined at 61.

Filtering is performed at 63 by simulation of a transmit FIR filter. Other cell impairments are introduced at 62. The filtered, QPSK data and other cell interference are combined together with impairments introduced at 64. The "transmitted" signal undergoes filtering by receiver FIR filters simulated at 65. The functions normally performed on the received signals by a receiver are simulated at 66. The outputs from 66 are measured at 67 and includes BLER, raw BER, signal-to-interference ratio (SIR) estimate, etc.

A working definition and description of each impairment is set forth below.

Linear impairments include amplitude imbalance, phase imbalance, phase jitter, carrier leakage/suppression, carrier offset, and dc offset, each of which is described herein below.

Amplitude imbalance is a condition in the receiver/transmitter wherein the gain of the I and Q channels are not equal. The mathematical model for amplitude imbalance is as follows:

$$I'=I \cdot \sqrt{2} \cdot \cos(\pi/4+X)$$

$$Q'=Q \cdot \sqrt{2} \cdot \sin(\pi/4+X)$$

Where I'=the impaired value of I,
Q'=the impaired value of Q, $$X = \text{imbalance control} = \tan^{-1}(10^{-\delta/20}) - \pi/4$$

$$\delta = \text{imbalance in dB} = 10\log\left(\frac{I_{err}}{Q_{err}}\right)^2 = 10\log\left(\frac{\sqrt{2}\cos(\pi/4+X)}{\sqrt{2}\sin(\pi/4+X)}\right)^2$$

Software limits are defined for amplitude imbalance model parameters. The range is preferably limited to $\delta=+/-3$ dB.

Phase imbalance is a condition in the receiver/transmitter where the insertion phase between I and Q channels is offset from the expected 90 degrees. The mathematical model is:

$$I'=I \cdot \cos(\phi)+Q \cdot \sin(\phi)$$

$$Q'=Q \cdot \cos(\phi)+I \cdot \sin(\phi)$$

Where I'=the impaired value of I,
Q'=the impaired value of Q,
$\phi$=phase error in degrees.

Software limits are defined for phase imbalance model parameters. The range is preferably limited to $\phi=+/-15$ degrees.

Phase Jitter is a condition where the noise generated inside an amplifying device is manifested as a small amount of Gaussian noise modulating the phase between I and Q channels. The mathematical model is $$I'=I \cdot \cos(\phi)+Q \cdot \sin(\phi)$$

$$Q'=Q \cdot \cos(\phi)-I \cdot \sin(\phi)$$

Where I'=the impaired value of I,
Q'=the impaired value of Q,
$\phi=\phi_0 \cdot$random Gaussian noise
=phase error in degrees modulated by Gaussian noise
ranging between −1 and 1. The phase noise data is filtered to lie in the band of 2-10 kHz.
$\phi_0$=phase error in degrees.

Software limits are defined for phase jitter model parameters. The range is limited to $\phi_0=0$ to 5 degrees.

Carrier leak/suppression is a condition created due to slight DC offsets inside the quadrature modulators and has the effect of creating additional intermodulation distortion or reducing carrier suppression. The mathematical model is $$I'=I\cdot\sqrt{(1-k)}+I_{cl}$$

$$Q'=Q\cdot\sqrt{(1-k)}+Q_{cl}$$

Where I'=the impaired value of I,
Q'=the impaired value of Q,
$I_{cl}=k\cdot\cos(\phi)$
$Q_{cl}=k\cdot\sin(\phi)$
φ=carrier leakage phase angle in degrees.
ϵ=20 log(k)
→k=$10^{\epsilon/20}$
ϵ=carrier leakage in dB below full scale.

Software limits are defined for carrier leakage/suppression model parameters. Range for magnitude is limited to ϵ>12 dB, applied as a loss. Range for phase angle is limited to 0<φ<360 degrees.

Carrier offset is a condition where the carrier (i.e., local oscillator) is not exactly equal to the programmed frequency. The mathematical model is $$I'=I\cdot\cos(\phi)+Q\cdot\sin(\phi)$$

$$Q'=Q\cdot\cos(\phi)-I\cdot\sin(\phi)$$

Where I'=the impaired value of I,
Q'=the impaired value of Q,
φ=cumulative phase error in degrees across data block=φerrCarrOffset.
errCarrOffset=2π·carrOffsetHz/sampleRate.
carrOffsetHz=carrier offset in Hertz.
sampleFreq=chipFreq*txFIRoutSampleRate=3.84 MHz*5.
chipFreq=3.84 MHz for TDD.
txFIRoutSampleRate=typically 5 for TDD for impairment applied between tx & rx FIRs.

Software limits are defined for carrier offset model parameters. The range is limited to carrOffsetHz=+/−10 KHz.

DC offset is a condition in the receiver created due to slight DC offsets and has the effect of creating bias on the inphase and quadrature components of the signal. The mathematical model is $$I'=I+I_{dcoff}$$

$$Q'=Q+Q_{dcoff}$$

Where I'=the impaired value of I,
Q'=the impaired value of Q,
$I_{dcoff}=dcOffI/100.0$
$Q_{dcoff}=dcOffQ/100.0$
dcOffI=DC offset for I component as percentage of full scale (assumed to be 1.0).
dcOffQ=DC offset for Q component as percentage of full scale (assumed to be 1.0)

Software limits are defined for independent control of for I and Q DC offset model parameters. The range for each DC offset is limited to 30.0 percent. Common mode DC offset can be simulated by setting dc Off I=dc Off Q.

Non-linear impairments include AM-to-AM distortion and AM-to-PM distortion.

AM-to-AM distortion is an amplifier non-linearity condition where the output amplitude is not exactly proportional to the input amplitude, which condition typically occurs near or at the maximum output level of the amplifier. The mathematical model is $$I'=I\cdot(1-k\cdot(I^2+Q^2))$$

$$Q'=Q\cdot(1-k\cdot(I^2+Q^2))$$

Where I'=the impaired value of I,
Q'=the impaired value of Q,
k=coefficient of non-linearity for the am-to-am distortion.

The AM-AM distortion non-linearity coefficient, k, is related to intermodulation in dB by the following model:

Substituting $I=A\cos(\omega_1 t)$ and $Q=A\cos(\omega_2 t)$ into the above equation for I' and ignoring higher order products arrive at:

$$I'=(1-5/4k)\cdot\cos(\omega_1 t)-k/2\cdot\cos(2\omega_2-\omega_1)$$

This can be thought of as putting one tone on I and another tone on Q, and getting out the fundamental tone and its third order product. Now the intermodulation is: IM=P3rd/P1st= $(k/2)^2/(1-5/4\ k)^2$, but considering that k<<1 and changing to dB get:

$$IM=20\ \log(k/2)$$

Software limits are defined for AM-to-AM distortion model parameters. The range for intermodulation product is limited to the range between 50 db to 20 db below signal level.

AM-to-PM distortion is an amplifier non-linearity condition where a change to the input level causes a corresponding change in the insertion phase. This condition typically occurs near or at a maximum output level of the amplifier. The mathematical model is $$I'=I\cdot\cos(\phi)-Q\cdot\sin(\phi)$$

$$Q'=Q\cdot\cos(\phi)+I\cdot\sin(\phi)$$

Where I' the impaired value of I,
Q'=the impaired value of Q,
$\phi=k\cdot(I^2+Q^2)^2$
k=coefficient of non-linearity for the am-to-pm distortion.

The non-linearity coefficient, k, is related to degrees by the following model: For AM-PM distortion, apply the same tone to both channels. This can be thought of as applying two equal magnitude vectors on I and Q, in which case the output should be a vector at angle 45 degrees. AM-PM causes the vector to rotate from the ideal 45 degrees. Substituting $I=Q=A\cos(\omega t)$ into above equations for I' and Q' nd assume only small angles using the following small angle approximations:

$$\sin(\phi)=\phi,\ \cos(\phi)=1-(\phi^2)/2$$

After substitution and cleanup arrive at:

$$I'=(-3/2\cdot k^2+7/2\cdot k+1)\cdot\cos(\omega t)$$

and $$Q'=(-3/2\cdot k^2-7/2\cdot k+1)\cdot\cos(\omega t)$$

The angle of the vector is arctan(I'/Q'). Considering that for k=0, the angle is 45 degrees and that the error is the angle of the vector −45 degrees, the following equation can be used to represent the AM-PM distortion error in degrees:

$$\text{Error (degrees)}=\arctan[(3\cdot k^2-7\cdot k-2)/(3\cdot k^2+7\cdot k-2)]-45$$

Software limits are defined for AM-to-PM distortion model parameters. The range for error is limited to 0 to 10.0 degrees.

Filter response impairment modeling includes phase ripple (group delay variation), gain ripple and non-ideal shaping filters.

Phase ripple (Group Delay Variation) is a condition where the group delay varies across the signal bandwidth. The major contributors to phase ripple are system filters.

Figure 4:
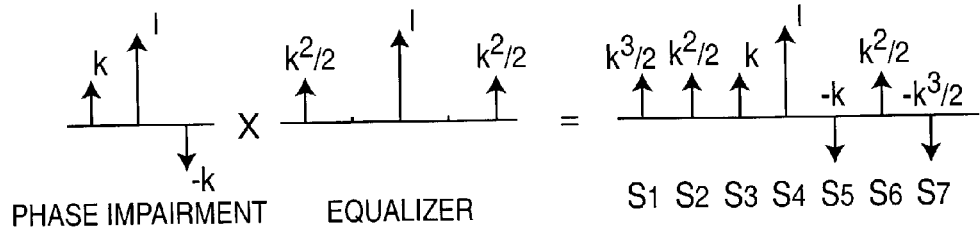
FIG. 4 is a plot showing the time domain representation of phase ripple derivation.
Figure 5:
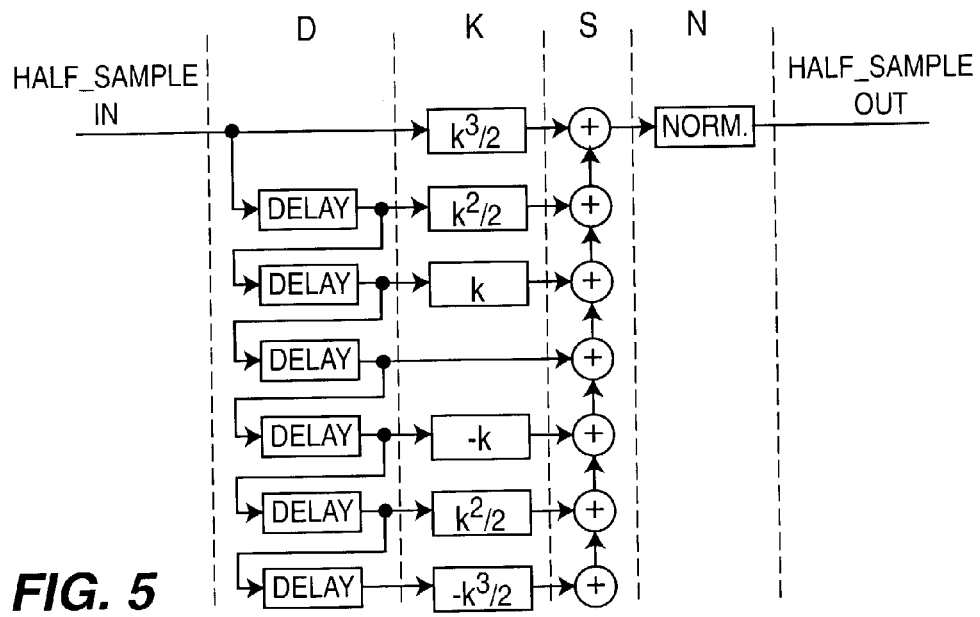
FIG. 5 is a diagram showing a phase ripple model.

The impairment is modeled as the product of phase impairment and an equalizer. FIG. 4 shows the time domain representation of the phase ripple derivation. Undesirable error terms have been dropped from the result. FIG. 5 shows a graphical representation of the impairment implemented by a plurality of delay lines arranged in a column D, a plurality of multipliers arranged in a column K, a plurality of summing circuits arranged in a column S and a normalization circuit N, Where:

Delay is the delay factor for phase ripple as derived below;
  $f_c$=chip frequency,
  $f_r$=frequency of phase ripple,
  n=delay in complex samples,
  $\tau$=period of phase ripple=$n/f_s$,
  m=fir sampling rate,
  $f_s$=sampling frequency=$m \cdot f_c$,
  fi=bandwidth of interest=$f_s/2$,
  $f_r = 1/\tau = f_s/n = m \cdot f_c/n$,
  $n = f_s/f_r = m \cdot f_c/f_r$,
  Delay=$2 \cdot n$ k is the group delay coefficient as derived below;
  $T_{GDV}$=peak to peak group delay, typically in units of nanoseconds;
  $T_{GDV} = 4 \cdot \tau \cdot k = 4 \cdot n \cdot k/f_s$,
  $k = T_{GDV} \cdot f_s/4$ The following empirically derived normalization term is applied to resulting signal;

$$\text{norm} = 1 - k^2 + k^3/8 + k^4/2 + k^5/2 - 0.00001$$

Software limits are defined for phase ripple model parameters. The range for ripple frequency is limited to 120 to 960 KHz. The range for peak-to-peak group delay is limited to the range from 1 to 600 nano seconds.

Gain ripple is a condition where the gain varies across the signal bandwidth. The major contributors to gain ripple are system filters.

Figure 6:
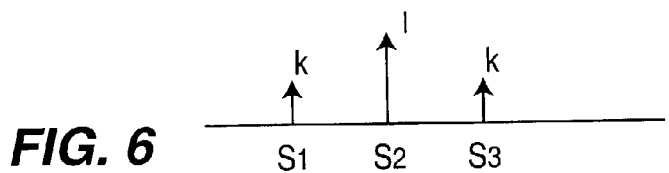
FIG. 6 is a plot showing the time domain representation of gain ripple derivation.
Figure 7:
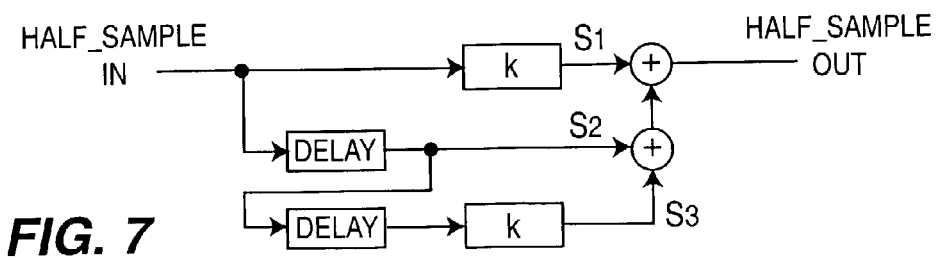
FIG. 7 is a block diagram showing a gain ripple model.

FIG. 6 is a time domain representation of gain ripple derivation. The impairment is modeled as shown in FIG. 7, Where:

Delay is the delay factor for gain ripple as derived below;
  $f_c$=chip frequency,
  $f_r$=frequency of gain ripple,
  n=delay in complex samples,
  $\tau$=period of gain ripple=$n/f_s$,
  m=fir sampling rate,
  $f_s$=sampling frequency=$m \cdot f_c$,
  fi=bandwidth of interest=$f_s/2$,
  $f_r = 1/\tau = f_s/n = m \cdot f_c/n$,
  $n = f_s/f_r = m \cdot f_c/f_r$,
  Delay=$2 \cdot n$ k is the gain ripple coefficient as derived below;
  R=peak to peak ripple amplitude,
  $R = 20 \cdot \log[(1+2 \cdot k)/(1-2 \cdot k)]$, $$k = 1/2 \cdot [(10^{R/20} - 1)/(10^{R/20} + 1)]$$

Software limits are defined for gain ripple model parameters. The range for ripple frequency is limited to 120 to 960 KHz. The range for peak-to-peak ripple amplitude is limited to the range form 0.2 to 2.0 dB.

It should be noted hereinabove the model includes frequency as an input parameter but review of the equation for k set forth above shows no frequency dependence for the gain ripple as modeled.

Non-ideal pulse shaping filters can contribute significantly to adjacent channel leakage power ratio (ACLR), error vector magnitude (EVM), peak code domain error (PCDE). By defining two signal paths in the test environment a set of non-ideal FIR filter taps can be compared to an ideal set of FIR filter taps to study the EVM and PCDE impact of non-ideal pulse shaping filters.

The tests described above may be conducted to simulate wired or wireless communications by introducing impairments respectively encountered in wired and wireless communications, wherein wired communications include fiber optic, copper or other conductive cables, coaxial cable and the like.

What is claimed is:

1. A method for evaluating a transmitter designed for use in a digital communication system, comprising:
    a) modeling a transmitter for employment in first and second testing channels;
    b) introducing at least one impairment into at least one of said channels; and
    c) comparing the channels to determine an effect of the impairment on a transmitter output to aid in transmitter design.

2. The method of claim 1 wherein said impairment is a linear impairment.

3. The method of claim 1 wherein said impairment is a non-linear impairment.

4. The method of claim 1 wherein at least one linear impairment and at least one non-linear impairment is introduced.

5. The method of claim 1 comprising wherein step (b) includes modeling a baseband signal in I/Q complex representation.

6. The method of claim 1 wherein step (b) includes modeling of amplitude imbalance RF impairment at baseband.

7. The method of claim 1 wherein step (b) includes modeling of phase imbalance RF impairment at baseband.

8. The method of claim 1 wherein step (b) includes modeling of phase jitter RF impairment at baseband.

9. The method of claim 1 wherein step (b) includes modeling of carrier leakage RF impairment at baseband.

10. The method of claim 1 wherein step (b) includes modeling of DC offset RF impairment at baseband.

11. The method of claim 1 wherein step (b) includes modeling of phase ripple RF impairments at baseband.

12. The method of claim 1 wherein step (b) includes modeling of gain ripple RF impairment at baseband.

13. The method of claim 1 wherein step (b) includes modeling of amplitude modulation-amplitude modulation distortion RF impairment at baseband.

14. The method of claim 1 wherein step (b) comprises modeling of amplitude modulation-phase modulation distortion RF impairment at baseband.

15. The method of claim 1 further comprising evaluating non-ideal finite impulse response (FIR) filtering modeling.

16. The method of claim 1 further including modeling at least one impairment encountered in a wireless environment.

17. The method of claim 1 further including modeling at least one impairment encountered in a wired environment.

18. The method of claim 10 wherein a phase ripple is implemented through the employment of delay functions, multiplier functions, summing functions and a normalization function.

19. The method of claim 11 wherein a gain ripple impairment is implemented through the employment of delay functions, multiplier functions and summing functions.

20. A method for evaluating a receiver designed for use in a digital communication system, comprising:
- a) modeling a receiver for employment in each of first and second testing channels;
- b) introducing at least one impairment to one of said channels; and
- c) comparing outputs of the receiver from said channels to determine an effect of the impairment on a receiver output to aid in receiver design.

21. The method of claim 20 wherein said impairment is a linear impairment.

22. The method of claim 20 wherein said impairment is a non-linear impairment.

23. The method of claim 20 wherein step (b) includes modeling of carrier offset RF impairment at baseband.

24. The method of claim 20 wherein the modeling is at baseband.

25. The method of claim 20 wherein step (b) includes modeling of amplitude imbalance RF impairment at baseband.

26. The method of claim 20 wherein step (b) includes modeling of phase imbalance RF impairment at baseband.

27. The method of claim 20 wherein step (b) includes modeling of phase jitter RF impairment at baseband.

28. The method of claim 20 wherein step (b) includes modeling of phase ripple RF impairments at baseband.

29. The method of claim 20 wherein step (b) includes modeling of gain ripple RF impairment at baseband.

30. A method for evaluating a transmitter designed for use in a digital communication system, comprising:
- modeling a transmitter for employment in a testing channel;
- introducing at least one impairment to said channel; and
- determining an effect of the impairment on a transmitter output to aid in transmitter design.

31. The method of claim 30 wherein said modeling is coded in C language.

32. The method of claim 31 wherein models are imported into test benches which provide a desired simulation.

33. The method of claim 30 wherein the modeling is at baseband.

34. A method for evaluating a receiver designed for use in a digital communication system, comprising:
- modeling a receiver for employment in a testing channel which conveys a data signal to the receiver;
- introducing at least one impairment into said channel; and
- determining an effect of the impairment on a receiver output to aid in receiver design.

35. A method for evaluating a receiver designed for use in a digital communication system, comprising:
- modeling a receiver for employment in a testing channel which conveys a data signal to the receiver;
- introducing at least one impairment into said channel; and
- determining an effect of the impairment on a receiver output to aid in receiver design.

* * * * *

UNITED STATES PATENT AND TRADEMARK OFFICE
CERTIFICATE OF CORRECTION

PATENT NO.        : 7,336,701 B2
APPLICATION NO.   : 10/322166
DATED             : February 26, 2008
INVENTOR(S)       : Kearney et al.

It is certified that error appears in the above-identified patent and that said Letters Patent is hereby corrected as shown below:

At column 1, line 32, before the word "modem", delete "received" and insert therefor --receive--.

At column 3, line 13, after the word "coded", delete "them".

At column 3, line 16, before the word "number", insert --a--.

At column 4, line 18, delete "$I' = I \cdot \sqrt{\sqrt{2}} \cdot \cos(\pi/4+X)$" and insert therefor --$I' = I \cdot \sqrt{2} \cdot \cos(\pi/4+X)$--.

At column 4, line 19, delete "$Q' = Q \cdot \sqrt{\sqrt{2}} \cdot \sin(\pi/4+X)$" and insert therefor --$Q' = Q \cdot \sqrt{2} \cdot \sin(\pi/4+X)$--.

At column 5, line 10, delete "$\rightarrow k = 10^{\epsilon/20}$" and insert therefor --$\Rightarrow k = 10^{-\epsilon/20}$--.

At column 6, line 4, before the word "distortion", delete "am-to-am" and insert therefor --AM-to-AM--.

At column 6, line 32, after "I'", insert --=--.

At column 6, line 35, before the word "distortion", delete "am-to-pm" and insert therefor --AM-to-PM--.

At column 6, line 44, before the word "assume", delete "nd" and insert therefor --and--.

At column 7, line 2, after the word "signal", delete "bandwith" and insert therefor --bandwidth--.

UNITED STATES PATENT AND TRADEMARK OFFICE
CERTIFICATE OF CORRECTION

PATENT NO.      : 7,336,701 B2
APPLICATION NO. : 10/322166
DATED           : February 26, 2008
INVENTOR(S)     : Kearney et al.

It is certified that error appears in the above-identified patent and that said Letters Patent is hereby corrected as shown below:

At column 7, line 40, after the word "signal", delete "bandwith" and insert therefor --bandwidth--.

Signed and Sealed this

Fifteenth Day of July, 2008

JON W. DUDAS
*Director of the United States Patent and Trademark Office*